UNITED STATES PATENT OFFICE.

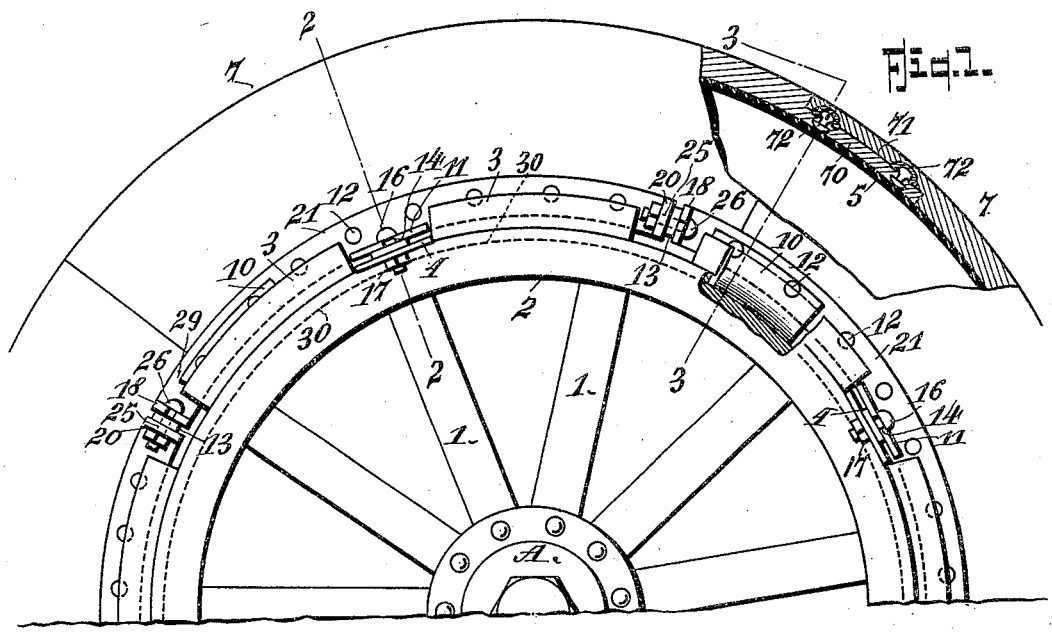

DOMENICO RONCONI, OF EVELETH, MINNESOTA.

WHEEL-TIRE.

1,050,297. Specification of Letters Patent. Patented Jan. 14, 1913.

Application filed October 27, 1911. Serial No. 657,139.

*To all whom it may concern:*

Be it known that I, DOMENICO RONCONI, a subject of the King of Italy, residing at Eveleth, in the county of St. Louis and State of Minnesota, have invented a new and Improved Wheel-Tire, of which the following is a specification.

This invention relates to improvements in that class of pneumatic tires comprising connected sections, and it primarily has for its object to provide a tire of the general character mentioned, in which any one of the several sections when damaged, can be readily replaced without dispensing with the entire tire.

In its specific nature this invention relates to improvements on the tire construction disclosed in my Patent No. 1,008,284, dated November 7, 1911, and the said invention consists in the details and peculiar arrangement of parts hereinafter fully described, specifically pointed out in the appended claims, and illustrated in the accompanying drawing, in which:—

Figure 1 is a side elevation of a portion of a wheel equipped with my improved construction of tire, parts being shown in section. Fig. 2 is a cross section of the tire taken on the line 2—2 on Fig. 1. Fig. 3 is a similar view thereof taken on the line 3—3 on Fig. 1. Fig. 4 is a perspective view of one of the removable tire sections, and Fig. 5 is a perspective view, parts being in section, of the meeting ends of a pair of the removable sections.

In carrying out my invention the wheel, comprising the hub A, the spokes 1, and the felly 2, may be of any well known construction.

3 designates metal retaining rims mounted upon the felly 2, between which are mounted and with which connect the independently removable tire sections, the peculiar construction of which and the means for detachably joining them, forming the essential features of my present invention. The rims 3 include retaining flanges 30 that extend at right angles to the rim proper 3, and it is between the said flanges 30 that the pneumatic and removable tire sections are detachably mounted.

The tire proper is composed of a series of sections 7 of like construction, and these have their adjacent ends reduced in thickness whereby to form lap joints, the externally reduced end 70 of one section fitting into the internally reduced end 71 of the adjacent section 7, and the said two ends are firmly secured by snap buttons and eyelets 72, as shown.

To provide for positively holding the tire upon the rim and to prevent the several tire sections from abnormally bulging at points between their interlocked ends, and further, for maintaining a desired stability at the points of connection of the adjacent ends of the tire sections, the reduced ends of the innermost sections 70 are formed with flaps 10, which, when adjusting the several tire sections upon the wheel rim, fold up over the enlarged edges 27 of the outer tire sections 7 and over the extended portions of the connecting members 21, presently again referred to, the outer ends of the flaps being secured by some of the rivets 12 that fasten the connecting members 21 to the said outer tire sections 7, as is best shown in Fig. 3 of the drawing. By connecting the joining ends of the several tire sections as stated and shown, the durability of the complete tire is greatly increased since the said connections are such that a substantially continuous or single tubing is thereby created.

By referring now more particularly to Figs. 2 and 4 it will be noticed, a metal rim or retaining rim 3 is mounted on each edge of the felly and the short horizontal flanges or portions 4 of the said rims have apertures 15 for receiving the fastening bolts 16, presently again referred to.

21—21 designate the connecting members, of which there is one for each lower edge of the flexible tube section 7, and the said members are in the nature of metal strips secured to the said sections by rivets 12. In my present invention, the connecting members or strips 21 while they are arranged somewhat similar to the showing of the metal fastening strips in my patent before referred to, in the present case they are attached to their respective tire sections 7 in such manner that one end thereof extends beyond the female or receiving end of the section 7 as indicated by 29, and likewise stop short of the other end of the said section. The object in forming each strip 21 with an extension 29 is that it provides, as it were, a solid member over which the flaps 10 may be folded, so as to produce a durable and positive connection.

At the points where the flaps 10 bend over the lower edges 27 of the outer tire members, the said edges 27 are sufficiently reduced in thickness, see Fig. 5, so that when the flaps 10 are bent thereover, the thickness of the said flap serves to produce a uniform thickness for the lower edges of the tires 7 their full length.

The end 29 of each strip 21 is bent out at right angles to form a locking lug 20, and it has an aperture 25 to receive a clamping bolt having a headed shank 26 for interlocking with the bifurcated angle lug 18, formed on the other end of the next adjacent strip 21, it being understood that each strip 21 has an apertured lug 20, at one end, and a bifurcated lug 18, at the other end.

For adjusting the metal strip connections 21, one or more yieldable spacers or washers 13 are held between the clamped ends of the said strips 21. Each connecting strip has a lateral and horizontally disposed flange 11 formed with a longitudinal slot 23, and a transverse slot 14, that merges with the other slot 23, and in fitting the several parts, the slotted flanges receive the bolts 16, which have nuts 17 for securely clamping the strips 21 down onto their respective rim portions 3, yielding washers 13 being also used between the members 3 and 4 to provide for the desired adjustment of the parts.

It may be well to state in addition to the previous description of the strip connection 21, that they perform a very important function in maintaining a stable construction of wheel, in that the alternately extended ends 29 and 20 may be supplied with a plurality of washers 13, which may either be added to or substracted in order to obtain a tight fitting of the sections 7, it being obvious that by this method, any opening of the abutting joints of the aforesaid sections 7 may be closed by taking out the required number of washers 13. Should it be desired to move one of the said sections 7, loosening of nut 17 and bolts 26 is all that is required, the remaining sections keeping their places independently, which would not be the case were the flanges 11 and 4 not provided, the above brief description, it is thought brings out more clearly the function of the aforesaid flanges.

5 designates the inner or inflatable tube which is of the usual form.

From the foregoing taken in connection with the drawing, the complete construction and arrangement of the parts that constitute my improved wheel tire, will be readily understood. By reason of the said construction and coöperative connection of the parts the tire may be readily taken apart and a new section put in to replace a disabled section, without dispensing with the entire tire. By making the connections that secure the tire sections in longitudinal alinement at points out of line with the interlocked or lapped ends of the said tire sections, and providing yieldable spacing or adjusting disks or washers between the joined ends of the several strips 21, provision is made for a limited yielding of the said connections, thereby reducing danger of breaking or snapping the said connections during use of the wheel.

What I claim is:—

1. A tire of the character described comprising a plurality of arc-shaped sections having interlockable overlapping ends, means for holding the several sections in longitudinal alinement, the said means comprising metallic strips permanently secured to the side edges of each arc-shaped section, the said strips having one end projected beyond the section to which they are attached, whereby to extend over the adjacent section and engage with the contiguous end of the metallic members on the said adjacent section, clamp devices for detachably interlocking the meeting ends of the said metallic members, and retaining rims for coöperating with the metallic tire section connecting members, said rim including a flange for lapping over the said metallic members, and means interlockably connecting the said retaining rims with the said metallic members.

2. In a wheel tire of the character described, the following elements in combination with the wheel felly; a plurality of arc-shaped tire sections having overlapping and interlocking ends, means for detachably securing the arc-shaped sections in longitudinal alinement whereby to form a tire, the said means comprising metallic strips permanently secured to the side edges of each individual arc-shaped section, the said metallic strips for each individual section extending at one end beyond the said individual section, and having the other end stopped short of the other end of the said individual section, whereby when the arc-shaped sections are joined the projecting ends of one set of metallic strips will abut the adjacent ends of the metallic strips on the adjacent tire section, means for detachably connecting the abutting ends of the metallic strips, a retaining rim for each set of metallic strips mounted upon the wheel felly, said rim including a horizontal portion and a vertical flange, the horizontal portion being apertured at intervals, means for connecting the slotted flanges of the metallic strips to the horizontal flanges of the retaining rims at their apertured portions, the said means including yieldable spacing washers.

3. In a wheel tire of the character described, the following elements in combination with the wheel felly; a plurality of arc-shaped tire sections having overlapping and interlocking ends, means for detachably securing the arc-shaped sections in longitudinal alinement whereby to form a tire, the said means comprising metallic strips permanently secured to the side edges of each individual arc-shaped section, the said metallic strips for each individual section extending at one end beyond the said individual section, and having the other end stopped short of the other end of the said individual section, whereby when the arc-shaped sections are joined the projecting ends of one set of metallic strips will abut the adjacent ends of the metallic strips on the adjacent tire sections, means for detachably connecting the abutting ends of the metallic strips, a retaining rim for each set of metallic strips mounted upon the wheel felly, said rim including a horizontal portion and a vertical flange, a horizontal portion being apertured at intervals, means for connecting the slotted flanges of the metallic strips to the horizontal flanges of the retaining rims at their apertured portions, the inner one of the overlapping ends of the arc-shaped sections having lateral flaps for bending up over the metallic strips and to be clamped by the vertical flanges of the retaining rims.

4. A tire of the character described comprising a plurality of arc-shaped sections having overlapping ends, means for detachably securing the said overlapped ends together above their edges, and means permanently secured to the side edges of each individual arc-shaped section, consisting of metallic strips, each of said strips being so arranged whereby a portion thereof extends beyond the meeting edges of the tire sections to form extensions, the inner one of the overlapped ends of each pair of sections having flaps foldable over the outer overlapping end of the adjacent section and over the extensions of the metallic strips, and means for securing the said foldable portions.

5. A tire of the character described comprising a plurality of arc-shaped sections having overlapping ends, means for detachably securing the said overlapped ends together above their edges, and means permanently secured to the side edges of each individual arc-shaped section, consisting of metallic strips, each of said strips being so arranged whereby a portion thereof extends beyond the meeting edges of the tire sections to form extensions, the inner one of the overlapped ends of each pair of sections having flaps foldable over the outer overlapping end of the adjacent section and over the extensions of the metallic strips, means for securing the said foldable portions and retaining rims for engaging the said folded portions and the metallic strips.

In testimony that I claim the foregoing as my invention I have signed my name in presence of the subscribed witnesses this 21st day of September 1911.

DOMENICO RONCONI.

Witnesses:
P. F. HUNTINGTON,
L. M. BARRETT.

---

Copies of this patent may be obtained for five cents each, by addressing the "Commissioner of Patents, Washington, D. C."